United States Patent Office 3,389,962
Patented June 25, 1968

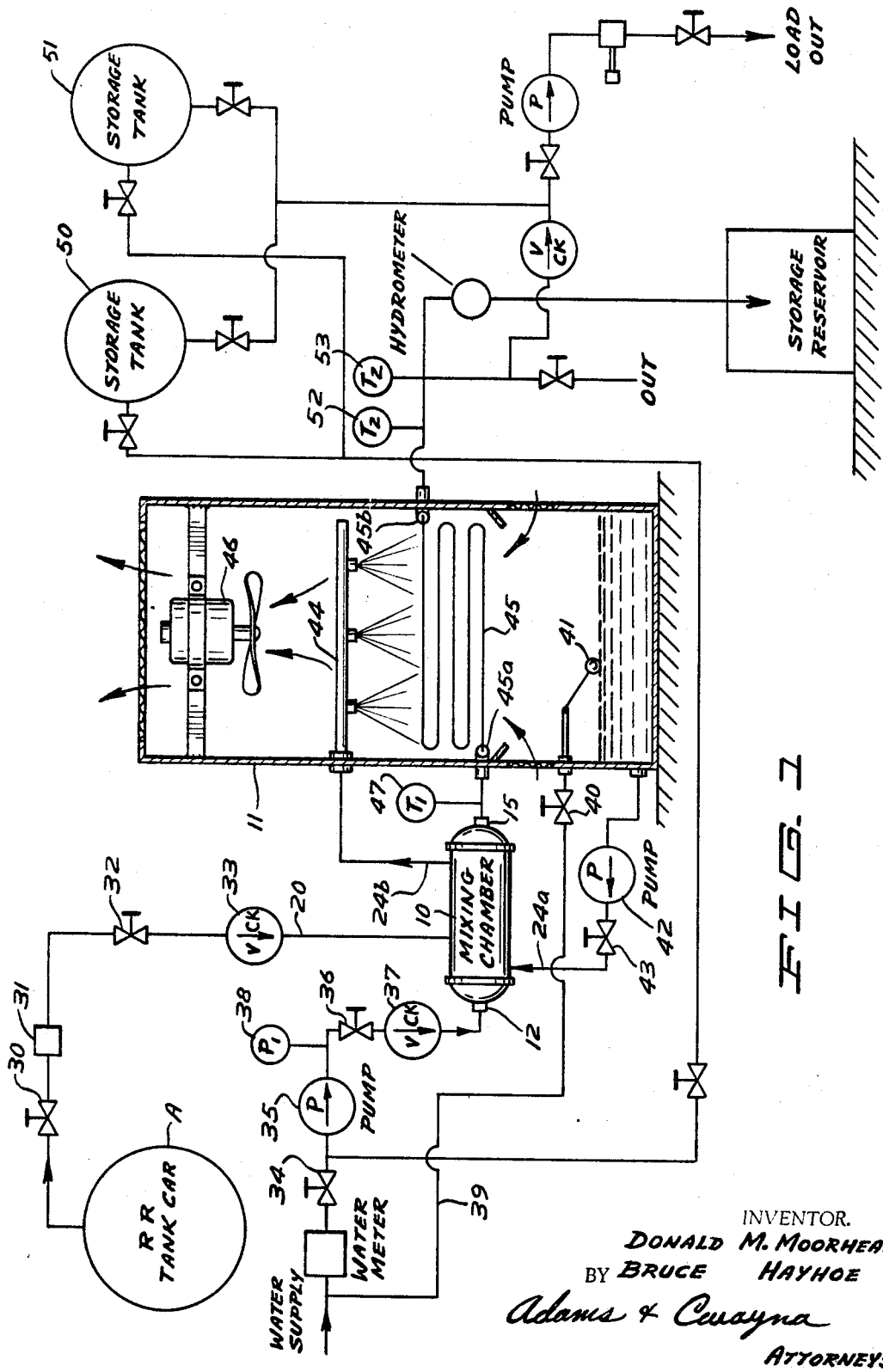

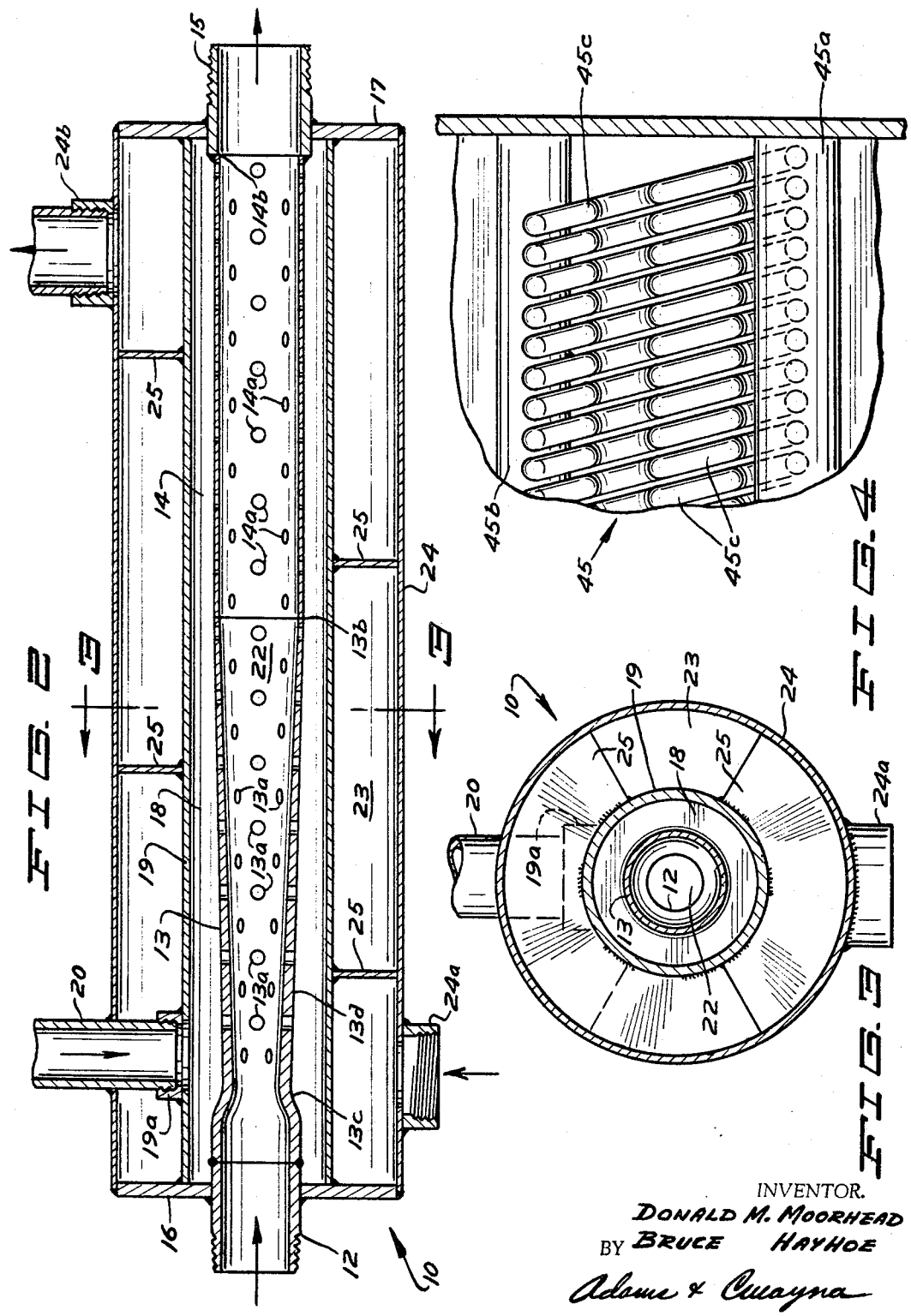

3,389,962
METHOD FOR CONVERSION OF ANHYDROUS AMMONIA TO AQUEOUS AMMONIA AND APPARATUS THEREFOR
Donald M. Moorhead, Minneapolis, and Bruce Hayhoe, Wayzata, Minn., assignors to Moorhead Machinery & Boiler Company, Minneapolis, Minn., a corporation of Minnesota
Filed Oct. 24, 1965, Ser. No. 504,509
7 Claims. (Cl. 23—193)

ABSTRACT OF THE DISCLOSURE

This invention relates to a method and apparatus for converting anhydrous ammonia to aqueous ammonia and includes the proper supplies of water and anhydrous ammonia fed into a mixing chamber with further cooling of the aqueous ammonia after it leaves the chamber. The mixing chamber basically includes a venturi tube section through which water is pumped to lower the pressure of the water as it passes through the venturi which lowering of pressure will draw anhydrous ammonia into a mixing chamber which mixing chamber actually occupies a portion of the venturi and a continuing tubular section extending from the venturi all contained in a jacketed container. Surrounding the anhydrous ammonia inlet is a second water jacket which is provided with recycled spray water to flow therethrough thereby removing the normally accompanying ice forming around the anhydrous ammonia chamber such that the final effect will be to cool the mixing chamber interiorly of the anhydrous ammonia chamber and inlet and lower the temperature of the spray water, thereby minimizing make-up water requirements.

---

In the process of converting anhydrous ammonia to aqueous ammonia various methods and procedures as well as conversion chambers to accomplish this conversion have been provided. Each of these available methods does perform the desired function but through use of the invention provided herein the conversion time may be substantially reduced and the efficiency of conversion may be substantially increased. Of the presently available methods of conversion the one most commonly used consists primarily of a venturi flow tube through which raw water is provided and which is surrounded by a jacket into which anhydrous ammonia is introduced. The flow of the raw water through the venturi tube draws the anhydrous ammonia therein where it is mixed with the water. This mixing and conversion process produces a large amount of heat and the aqueous ammonia delivered from the converter is at a substantially elevated temperature due to the heat generated by this conversion.

In the standard mixing chamber a certain expansion of the ammonia also takes place. Naturally as the ammonia expands the temperature is substantially lowered and it is the usual situation to find the mixing chambers completely coated and covered with ice. This ice accumulation is present even though the product of aqueous ammonia is at a substantially elevated temperature.

Through the design provided in applicant's invention an additional liquid carrying jacket is provided about the ammonia jacket with means to provide a flow of liquid therethrough. This flowing liquid substantially removes the normally accumulated ice from the ammonia jacket thus lowering its own temperature and also keeping the exterior walls of the ammonia jacket clear to permit the heat generated by conversion to pass therethrough. The total effect of this combination then provides a cooling effect to both the liquid introduced into the jacket and a lower temperature to the aqueous ammonia product.

In the invention provided herein this cooled liquid then may be used to further cool the aqueous ammonia in a subsequent step. Likewise, the production of an initially relatively cool aqueous mixture provides a more efficient mixing process and substantially reduces the time for the conversion process to allow the aqueous ammonia to be used in a relatively short time after conversion.

It is therefore an object of applicant's invention to provide an ammonia converting chamber highly efficient in the conversion process such that the conversion process may be completed in a relatively short period of time and such that the aqueous ammonia delivered therefrom may be cooled to its useable temperature in a relatively short period of time.

It is a further object of applicant's invention to provide an ammonia converting chamber having a raw water inlet and an anhydrous ammonia inlet for introducing and mixing the water and ammonia together and further to surround the mixing chamber with a cooling jacket such that the heat developed during the conversion process may be reduced and thereby reduce the discharge temperature of the aqueous ammonia.

It is a further object of applicant's invention to provide a method of converting anhydrous to aqueous ammonia whereby the heat of conversion is substantially reduced and thus the time of complete conversion to a useable product may be reduced.

It is a further object of applicant's invention to provide an ammonia converting chamber wherein the exterior surface of the mixing section thereof is maintained free of ice by providing a liquid flowing therepast which liquid is substantially reduced in temperature and is therefore useable in a subsequent cooling step.

It is a further object of applicant's invention to provide an ammonia conversion process whereby a turbulent flow is provided to the elements during mixing thereby achieving efficient and effective mixing.

These and other objects and advantages of this invention will more fully appear from the following description made in connection with the accompanying drawings, wherein like reference characters refer to the same or similar parts throughout the several views, and in which:

FIG. 1 is a schematic illustration of an entire ammonia conversion system embodying the mixing chamber of this invention;

FIG. 2 is a section taken longitudinally through a mixing chamber embodying the concepts of this invention;

FIG. 3 is a transverse section taken substantially along line 3—3 of FIG. 2;

FIG. 4 is a partial section showing a portion of the aqueous ammonia cooling coils used in the conversion system.

As shown in the accompanying drawings the process of ammonia conversion practiced in this invention generally includes an anhydrous ammonia supply system A from which ammonia may be delivered under pressure, a water supply system for supplying water under pressure, a mixing chamber generally designated 10, a product cooling chamber generally designated 11 and means for delivering the converted aqueous ammonia to storage tanks or other facilities. The mixing chamber 10 of this invention provides certain advantages heretofore unattainable with existing conversion equipment.

Chamber 10 itself is illustrated in FIGS. 2 and 3 and as shown in FIG. 2 the chamber 10 includes a raw water inlet 12 sealingly attached to a venturi or jet tube section 13 which section is substantially thin walled and which wall has a plurality of entrance openings 13a formed therein. As shown in FIG. 2a straight conduit section 14 is attached to the discharge end 13b of venturi section 13 and is likewise provided with a plurality of spaced openings 14a in the walls thereof. Discharge end 14b of straight section 14 is provided with an aqueous ammonia discharge connection 15. It should be noted that the apertures 13a–14a in both of said conduits 13–14 are arranged normal to the longitudinal axis of both of said conduits. Venturi conduit 13 is as shown, arcuate in shape and is provided with a necked down section 13c with the continuing side walls 13d diverging smoothly outward therefrom such that as raw water or other flowable material passes therethrough a pressure differential is created within the tube to draw substances through the openings 13a–14a where the substances will be mixed with the material passing therethrough. A pair of diametrically extending end flanges 16–17 are arranged respectively on the inlet 12 and discharge end 15.

A first anhydrous ammonia entrance chamber 18 is provided in surrounding relation to the mixing chamber which mixing chamber is designated 22 and extends substantially from the necked down portion 13c to the discharge end 14b of straight section 14. This ammonia chamber 18 is obtained by providing a conduit 19 extending between flanges 16–17 in surrounding relation to conduits 13–14 and which conduit 19 is sealingly attached to flanges 16 and 17. In the form shown an anhydrous ammonia inlet 20 is provided in closely spaced relation to necked down portion 13c of venturi portion 13 attached to conduit 19 through boss 19a and extends outwardly therefrom. The passage through conduit 20 naturally communicates with the ammonia chamber 18 and likewise as shown in FIG. 1 will communicate with the ammonia supply A.

A second chamber 23 is provided in surrounding relation to conduit 19 by providing an enlarged conduit 24 therearound with the ends thereof sealingly attached to flanges 16–17. This chamber 23 constitutes a liquid flow chamber wherein liquid will be introduced and will circulate about the ammonia jacket 19. This water will flow as illustrated from the inlet 24a through the outlet 24b thereby entirely circulating about the ammonia jacket 19. To effectively direct the cooling water in chamber 23 a plurality of baffles 25 are arranged between conduit 19 and cooling jacket 24. These baffles 25 are spaced longitudinally along the length of the chamber 23 and extend a predetermined arcuate distance around the chamber 23.

As previously stated, when no liquid flow jacket is provided around the ammonia jacket 19 this jacket tends to become coated with ice and therefore prevents transmission of heat through the wall 19. It is applicant's feeling that the flow jacket provided about the ammonia jacket 19 with the liquid flow therethrough tends to remove this ice thereby reducing its own temperature while likewise permitting the heat of mixture to flow from the venturi system thus providing a relatively cooler aqueous ammonia mixture.

When the anhydrous ammonia and water are mixed due to the venturi action of the fluid flowing through the mixing chamber 22 drawing anhydrous ammonia from chamber 18 through passages 13a–14a a great degree of heat of conversion is produced. As stated, providing a flow of cooling material through chamber 23 surrounding the mixing chamber a great quantity of this mixing heat is absorbed and thus the temperature of the converted liquid ammonia passing through discharge 15 is substantially reduced as compared to a system which does not have such a cooling chamber. This cooling effect then allows the user to operate under particularly high conversion speeds with no possibility of reaching dangerous temperature levels. Likewise this lower discharge temperature simplifies the arrangement necessary to cool the liquid ammonia to reduce its temperature to a useable level.

It has also been found that by providing the apertures 13a–14a in normal relation to the conduit wall surfaces a certain degree of turbulence is created to provide more thorough mixing and thus the concentration of ammonia in the final converted product may be substantially increased. This thorough mixing of course eliminates the necessity of additional conversion in order to bring the concentration up to the desired level.

Schematic diagram of FIG. 1 illustrates the application of the mixing chamber 10 and as shown in a typical application anhydrous ammonia is provided from a pressure source A such as a railroad tank car and flows therefrom through a safety tank valve 30, a meter 31 and a pressure throttling valve 32. A check valve 33 is also provided before the ammonia is fed into the mixing chamber 10 through conduit 20. Supply water enters water inlet 12 through a water meter, a first valve 34, a pressure pump 35 which particular use will be described hereinafter, a second control valve 36 and a check valve 37. A pressure indicator 38 may likewise be provided in the supply line. In this application raw water is also fed through conduit 39 from the supply into the product cooling chamber 11 through a control valve 40 and a level responsive valve member 41. Water for cooling chamber 23 is pumped from cooling tank 11 by pump 42 through valve 43 and into the chamber inlet 24a. This water after being circulated around the ammonia jacket 19 and having its temperature reduced thereby is directed through outlet 24b and into a spray nozzle 44 where it is sprayed over the product containing coils 45. This cooling water is then a closed system with the raw water from conduit 39 serving as makeup water. A circulating fan 46 drawing upwardly through the coils 45 increases the cooling effect on the coils.

Newly converted liquid ammonia passes through the coils 45 of cooling section 11 where its temperature is further reduced to provide the final product at a useable temperature. A temperature indicator 47 may be provided at the discharge 15 of mixing chamber 10.

After final cooling in cooling section 11 the liquid ammonia may be directed out of the system at the points designated OUT or LOAD OUT. The product may also be directed to storage tanks designated 50–51 from which it would be possible to feed back through the entire system in order to increase the concentration of ammonia in the product and in this case pump 35 would provide the pumping pressure and valve 34 would be closed such that a recirculatory system could be established.

A hydrometer is provided in the outlet line to provide monitoring of the ammonia concentration in the product and temperature and pressure sensing gauges 52–53 could be provided in the product output line.

With the cooling jacket 23 of the mixing chamber 10 the product outlet has been found to be approximately 125° and may be lowered substantially with additional flow of material. This is a substantial decrease from other available systems and the temperature after leaving the cooling coil 45 is reduced further to approximately 95° which is a reasonable figure for direct use of the ammonia. By operating at the substantially reduced temperatures it is possible to more rapidly convert anhydrous into liquid ammonia as there is no possibility of approaching high and dangerous temperature levels.

One further aspect of this invention includes a novel arrangement for the cooling coil 45 which is particularly illustrated in FIG. 4. In this arrangement an inlet header 45a is provided of a predetermined length and rather than a continuous coil, a plurality of individual coils 45c are arranged between the inlet header 45a and the outlet header 45b. This parallel coil arrangement allows a larger quantity of product to flow through the coil 45 and likewise allows faster cooling. The individual coils 45c are made up of a plurality of straight sections joined by 180° bends as is standard practice. However, the coils 45c are offset to vertical such that the individual straight sections provide a baffling effect for the air being drawn therethrough and the water passing downwardly thereover. This angular offset then increases the effective surface area of the coils aiding the cooling effect.

It should be obvious that applicant has provided a unique ammonia converting chamber wherein the heat of conversion may be removed from the conversion area and thus reduce the temperature of the output product which in turn allows the unit to operate at a higher speed and which therefore increases the overall efficiency of the unit. Likewise the method of cooling during the conversion process reduces the requirements for the final product cooling system.

It will, of course, be understood that various changes may be made in the form, details, arrangements and proportion of parts without departing from the scope of my invention, which generally stated consists in the matter set forth in the appended claims.

What we claim is:

1. Apparatus for converting anhydrous ammonia to aqueous ammonia including:
   (a) a mixing chamber having a water inlet and a water outlet with means for reducing the pressure of water as it flows therethrough;
   (b) an anhydrous ammonia chamber communicating with said mixing chamber having an inlet to admit anhydrous ammonia thereto;
   (c) means for cooling said mixing chamber during the mixing of the anhydrous ammonia with the water to reduce the heat of conversion produced thereby and thus substantially lowering the temperature of the output aqueous ammonia.

2. Apparatus for converting anhydrous ammonia to aqueous ammonia including:
   (a) a mixing chamber comprising a water flow conduit having an inlet and an outlet with means for reducing the pressure of the water as it flows therethrough;
   (b) an anhydrous ammonia chamber surrounding at least a portion of said conduit and having an inlet to admit anhydrous ammonia thereto;
   (c) means providing communication between said ammonia chamber and said mixing chamber to permit the ammonia to be drawn into said mixing chamber and be mixed with the water flowing therethrough;
   (d) a liquid flow chamber surrounding at least a portion of said mixing chamber;
   (e) means for introducing a liquid into said flow chamber to absorb heat from said mixing chamber whereby the product mixed therein may be substantially reduced in temperature.

3. Apparatus for converting anhydrous ammonia to aqueous ammonia including:
   (a) a mixing chamber comprising a water flow conduit having an inlet and an outlet with means for reducing the pressure of water as it flows therethrough to provide a venturi action;
   (b) an anhydrous ammonia chamber surrounding at least a portion of said water flow conduit with means for introducing anhydrous ammonia thereto;
   (c) a plurality of communicating passages provided between said ammonia chamber and said mixing chamber to permit the ammonia to be drawn into said mixing chamber by the venturi action of the water flowing thereto;
   (d) a liquid flow chamber surrounding at least a portion of said mixing chamber;
   (e) means for introducing a liquid into said flow chamber to absorb the heat from said mixing chamber whereby the heat of conversion may be substantially reduced.

4. Apparatus for converting anhydrous ammonia to aqueous ammonia including:
   (a) a mixing chamber comprising a water flow conduit having an inlet and an outlet end and a restrictor formed intermediate the ends thereof for restricting the pressure of water as it flows therethrough and having smoothly diverging side walls between said restrictor and said outlet end;
   (b) an anhydrous ammonia chamber sealingly surrounding said water flow conduit and having an inlet to admit anhydrous ammonia thereto;
   (c) means providing communication between said ammonia chamber and said mixing chamber;
   (d) a liquid flow chamber surrounding said ammonia chamber and said mixing chamber with means for introducing a liquid thereto to absorb the heat of conversion produced in said mixing chamber.

5. The structure set forth in claim 4 wherein said communication means between the water flow conduit and the ammonia chamber are provided through the side walls of the chamber normal to the longitudinal axis of said water flow conduit to provide turbulent mixing of the water and the drawn in anhydrous ammonia.

6. The structure set forth in claim 4 wherein said liquid flow chamber is provided with a plurality of baffle fins to insure circulation of the coolant about said mixing chamber.

7. The method of converting anhydrous ammonia to aqueous ammonia consisting in the following steps:
   (a) providing a supply of untreated water under pressure;
   (b) providing a supply of anhydrous ammonia in close communicating relation to the water flow;
   (c) reducing the pressure of the water to draw the anhydrous ammonia into the water stream;
   (d) cooling the water stream at the point of ammonia introduction to adsorb the heat produced by mixing the ammonia with the water.

References Cited

UNITED STATES PATENTS 2,872,297   3/1959   Dugan _____ 23—193

OSCAR R. VERTIZ, *Primary Examiner.*

H. S. MILLER, *Assistant Examiner.*